(12) United States Patent
Soled et al.

(10) Patent No.: US 7,538,066 B2
(45) Date of Patent: May 26, 2009

(54) METHOD OF PREPARING A HYDROTREATING CATALYST ON A SUPPORT CONTAINING A RARE EARTH METAL

(75) Inventors: Stuart L. Soled, Pittstown, NJ (US); Sabato Miseo, Pittstown, NJ (US); Joseph E. Baumgartner, Califon, NJ (US); Christine E. Kliewer, Clinton, NJ (US); Jeffrey T. Elks, Easton, PA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 517 days.

(21) Appl. No.: 11/238,930

(22) Filed: Sep. 29, 2005

(65) Prior Publication Data

US 2007/0082811 A1    Apr. 12, 2007

(51) Int. Cl.
*B01J 31/00*   (2006.01)
*B01J 27/02*   (2006.01)
*B01J 21/00*   (2006.01)
*B01J 23/00*   (2006.01)
*B01J 23/10*   (2006.01)

(52) U.S. Cl. .................. 502/303; 502/150; 502/216; 502/255; 502/258; 502/259; 502/260; 502/302; 502/304; 502/313; 502/315

(58) Field of Classification Search .......... 502/150, 502/216, 255, 258–260, 302–304, 131, 315
See application file for complete search history.

(56) References Cited

U.S. PATENT DOCUMENTS

| | | | | | |
|---|---|---|---|---|---|
| 2,500,146 | A | * | 3/1950 | Fleck et al. | 208/137 |
| 2,650,906 | A | * | 9/1953 | Engel et al. | 502/315 |
| 3,345,286 | A | * | 10/1967 | Kovach et al. | 208/254 H |
| 3,475,325 | A | * | 10/1969 | Doane | 208/111.3 |
| 3,810,830 | A | * | 5/1974 | Kouwenhoven et al. | 208/111.15 |
| 3,975,302 | A | * | 8/1976 | Courty et al. | 502/263 |
| 3,992,468 | A | * | 11/1976 | Cosyns et al. | 585/489 |
| 4,530,911 | A | * | 7/1985 | Ryan et al. | 502/74 |
| 4,837,193 | A | * | 6/1989 | Akizuki et al. | 502/242 |
| 5,001,101 | A | * | 3/1991 | Kemp | 502/211 |
| 2006/0149097 | A1 | * | 7/2006 | Soled et al. | 562/487 |

* cited by examiner

*Primary Examiner*—Patricia L Hailey

(57) ABSTRACT

This invention relates to supported multi-metallic catalysts for use in the hydroprocessing of hydrocarbon feeds, as well as a method for preparing such catalysts. The catalysts are prepared from a catalyst precursor comprised of at least one Group VIII metal and a Group VI metal and an organic agent selected from the group consisting of amino alcohols and amino acids.

33 Claims, No Drawings

METHOD OF PREPARING A HYDROTREATING CATALYST ON A SUPPORT CONTAINING A RARE EARTH METAL

FIELD OF THE INVENTION

This invention relates to supported multi-metallic catalysts for use in the hydroprocessing of hydrocarbon feeds, as well as a method for preparing such catalysts. The catalysts are prepared from a catalyst precursor comprised of at least one Group VIII metal and a Group VI metal and an organic agent selected from the group consisting of amino alcohols and amino acids. The support contains an effective amount of a dispersed metal oxide modifier, which metal is selected from the rare earths and yttrium. The catalyst precursor is thermally treated to partially decompose the organic agent, then sulfided.

BACKGROUND OF THE INVENTION

Environmental and regulatory initiatives are requiring ever-lower levels of both sulfur and aromatics in distillate fuels. For example, proposed sulfur limits for distillate fuels to be marketed in the European Union for the year 2005 is 50 wppm or less. There are also regulations that will require lower levels of total aromatics in hydrocarbons and, more specifically, to lower levels of multi-ring aromatics found in distillate fuels and heavier hydrocarbon products. Further, the maximum allowable aromatics level for U.S. on-road diesel, CARB reference diesel, and Swedish Class I diesel are 35, 10 and 5 vol. %, respectively. Further, the CARB and Swedish Class I diesel fuel regulations allow no more than 1.4 and 0.02 vol. % polyaromatics, respectively. Consequently, much work is presently being done in the hydrotreating art because of these proposed regulations.

Hydrotreating, or in the case of sulfur removal, hydrodesulfurization, is well known in the art and typically requires treating the petroleum streams with hydrogen in the presence of a supported catalyst at hydrotreating conditions. The catalyst is usually comprised of a Group VI metal with one or more Group VIII metals as promoters on a refractory support, such as alumina. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization. Nickel promoted molybdenum on alumina catalysts are the most widely used for hydrodenitrogenation, partial aromatic saturation, as well as hydrodesulfurization.

The ability to modify the nanostructural morphology of supported hydrotreating catalysts provides a possible way to control their activity and selectivity. One of the important thrusts in hydrotreating catalyst research has been the realization over the last few years that a key synthesis tool for modifying nanostructure involves the incorporation of carbon into the sulfide structure. For example, U.S. Pat. No. 4,528,089 teaches that the use of carbon-containing catalyst precursors gave more active catalysts than catalysts prepared from sulfide precursors without organic groups. Use of organic impregnation aids in preparing oxide catalyst precursors has also been studied for some time (Kotter, M.; Riekett, L.; Weyland, F.; *Studies in Surface Science and Catalysis* (1983), 16 (Prep. Catal. 3), 521-30 and U.S. Pat. No. 3,975,302). The importance of carbon incorporated in bulk $MoS_2$ hydrotreating catalysts has been studied in detail (Berhault, G,; Araiza, L. C.; Moller, A. D.; Mehta, A.; Chianelli, R.; *Catalysis Letters* (2002) 78 (1-4) 81-90).

While such catalysts have proven to be superior to more conventional hydrotreating catalysts, there still remains a need in the art for ever-more reactive and effective catalysts for removing heteroatoms, such as nitrogen and sulfur from hydrocarbon streams.

SUMMARY OF THE INVENTION

In an embodiment, there is provided a method for preparing a catalyst composition, which method comprises:
  (a) impregnating an inorganic catalyst support containing an effective amount of a modifier metal oxide, which metal is selected from the rare earth metals and yttrium, with an aqueous solution containing (i) a salt of a Group VIII metal selected from Co and Ni, (ii) a salt of a Group VI metal selected from Mo and W, and (iii) an effective amount of an organic agent selected from amino alcohols and amino acids;
  (b) drying said impregnated catalyst support to remove substantially all water, thereby resulting in a metal-organic on support catalyst precursor;
  (c) partially or fully calcining said substantially dried catalyst precursor in the presence of an oxygen-containing atmosphere;
  (d) sulfiding said partially oxidized catalyst precursor at sulfiding conditions in the presence of a sulfiding agent, thereby resulting in a sulfided catalyst composition.

In a preferred embodiment the metal of the metal oxide modifier is yttrium.

In another embodiment, the Group VIII metal is Co and the Group VI metal is Mo.

DETAILED DESCRIPTION OF THE INVENTION

The catalysts of the present invention will contain at least one Group VIII metal and at least one Group VI metal. The preferred Group VIII metal will be selected from the non-noble metals iron, cobalt, and nickel and the noble metals platinum, palladium, ruthenium, and iridium. More preferred are the non-noble metals, and most preferred are cobalt and nickel. The Group VI metal is selected from molybdenum and tungsten, preferably molybdenum. It is preferred that the catalyst of the present invention be comprised of one Group VIII metal, preferably cobalt and one Group VI metal, preferably molybdenum. The Group VIII metal, in terms of its oxide form, is typically present in an amount ranging from about 2 to about 20 wt. %, preferably from about 4 to about 12%. The Group VI metal, also in terms of its oxide, will typically be present in an amount ranging from about 5 to about 50 wt. %, preferably from about 10 to about 40 wt. %, and more preferably from about 20 to about 30 wt. %. All weight percents are based on the total weight of the catalyst.

Suitable support materials for the catalysts of the present invention include inorganic refractory materials such as alumina, silica, silicon carbide, amorphous and crystalline silica-aluminas, silica-magnesias, aluminophosphates boria, titania, zirconia, and mixtures and cogels thereof. Preferred supports include, silica, alumina, alumina-silica and the crystalline silica-aluminas, particularly those materials classified as clays or zeolitic materials. The more preferred support materials for purposes of the present invention are alumina, silica, and alumina-silica, with alumina and silica being the most preferred.

The support will also contain an effective amount of a metal oxide modifier, which metal is selected from the rare earth metals and yttrium. By effective amount we mean that: a) the rare earth oxide or yttrium oxide is dispersed on the surface of the support to such a degree that it is substantially not visible by X-ray diffraction, and b) it covers at least about 50% of the support surface. While not wishing to bound by theory, it is believed that anionic complexes will better disperse on the more positively charged surface, which will improve the dispersion of the resulting Group VI/Group VIII metal oxide complex and the resulting calcined oxide precursor, as well as the sulfide form of it. This effective amount will typically be from about 4 wt. % to about 20 wt. % based on the total weight of support and metal oxide modifier. The presence of the rare earth or yttrium metal disperses well on the support material and unexpectedly dramatically increases the isoelectric point of the support, that is, making the support more positive at a given pH. The rare earth and/or yttrium will remain as an oxide and be dispersed during sulfidation. This has an important applicability in diesel hydrotreating where increased dispersion brings higher activity.

The modifier metal can be added to the support by any suitable technique, preferably by a conventional incipient wetness technique. Also, the catalytic metals may be loaded onto the modifier metal-containing support by any suitable conventional techniques known in the art. Such a technique includes impregnation by incipient wetness, adsorption from excess impregnating medium, and by ion exchange. Preferred is incipient wetness followed by calcination. The metal oxide bearing catalysts of the present invention are typically dried, calcined, and sulfided. As previously mentioned, it is preferred to first prepare a catalyst precursor composition. The catalyst precursor of the present invention is prepared by use an organic agent. Organic agents suitable for use in the practice of the present invention include the amino alcohols and amino acids. Non-limiting examples of suitable amino acids include natural and synthetic amino acids. The natural amino acids include all isomers of the following: alanine, arginine, asparagines, aspartic acid, cysteine, cystine, 3,5-dibromotyrosine, 3,5, diiodotyrosine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine and valine, a particularly preferred amino acid is L-arginine.

Suitable amino alcohols for use in the practice of the present invention include the mono-, di-, and tri-, substituted aliphatic hydroxyalkylamines such as methanolamine, di-methanolamine, tri-methanolamine, ethanolamine, di-ethanolamine, tri-ethanolamine, butanolamine, di-butanolamine, tri-butanolamine, propanolamine, di-propanaolamine, and tri-propanolamine. Also preferred are N,N,-dialkyl-ethanolamines, N-alkyl-diethanolamines, N-alkyl-ethanolamines, N,N,-dialkyl-methanolamines, N-alkyl-dimethanolamines, N-alkyl-methanolamines and equivalent propanolamines, butanolamines, hexanolamines and heptanolamines. Most preferred is triethanolamine. In these alkanolamines, the N-alkyl group may be a hydrocarbon or substituted hydrocarbon group containing from about 1 to 50 carbon atoms, preferably about 1 to 8 carbon atoms and most preferably about 1 to 4 carbons atoms such as methyl, ethyl, n-propyl, isopropyl, n-butyl, isobutyl, n-pentyl, isopentyl, n-hexyl, isohexyl etc.

Examples of dialkylamino groups include $C_3$-$C_{50}$-dialkylaminoalkyl, preferably $C_3$-$C_{20}$-dialkylaminoalkyl, particularly preferably $C_3$-$C_{10}$-dialkylaminoalkyl such as dimethylaminomethyl, dimethylaminoethyl, diethylaminoethyl, di-n-propylaminoethyl and diisopropylaminoethyl.

The organic agent and Group VIII and Group VI metals can be incorporated into the support material to produce a catalyst precursor in either two separate steps, or in a single step wherein both metals are co-precipitated onto the support along with the organic agent. For example, in a two process the catalyst precursor can be prepared by impregnating a catalyst support with a first aqueous solution comprised of an effective amount of organic agent and a water soluble salt of either the Group VIII metal or the Group VI metal, in such concentration that will provide the resulting catalyst precursor with the desired amount of the metal. The impregnated support is then dried by any suitable conventional drying techniques, preferably at a temperature of about 100° C. for an effective amount of time until substantially all water is driven off. This effective amount of time will typically range from about 2 to about 6 hours.

The dried impregnated support, which now contains a metal-organic component is then either partially or fully oxidized. That is, for the partially oxidized case, the dried impregnated support is heated from drying temperatures above about 200° C., preferably from about 250° C. to about 325° C., preferably from about 275° C. to about 300° C. by increasing the temperature to calcination conditions stepwise, in the presence of an oxidizing gas to a degree wherein only partial oxidation, or decomposition, of the organic portion of the metal-organic component results. By partial oxidation, or decomposition, we mean that at least about 20 wt. %, but not all, of the organic component is decomposed. At least a portion of the resulting partially formed catalyst precursor is impregnated a second time with an aqueous solution containing an effective amount of an organic agent and an effective amount of a water-soluble salt of the remaining metal not impregnated during the first impregnation. For example, if a Group VIII metal was impregnated on the support during the first impregnation, then the Group VI metal will be impregnated onto the same support in this second impregnation. The partially formed catalyst precursor, now containing the second metal-organic component, is then subjected to drying to drive off substantially all of the water. The dried partially formed catalyst precursor is then also oxidized stepwise to also partially oxidize the organic portion of the second metal-organic component, thus resulting in the final catalyst precursor comprised of the desired amounts of Group VIII and Group VI metals and an organic agent residue, or remnant on a support. Alternatively, the sample can be oxidized at a temperature where all of the organic is removed.

Another method for preparing the catalyst precursor of the present invention is to co-impregnate both the Group VIII metal and the Group VI metal, along with the organic agent in a single impregnation step. The resulting co-impregnated support will then be dried to drive off substantially all of the water and oxidized, by calcination, to a degree wherein only a portion of the organic component will be decomposed, thus forming a final catalyst precursor. By only a portion we mean from about 20 wt. % to about 80 wt. % is decomposed as previously mentioned. Thus, the decomposition steps can be easily separated.

The catalyst precursor of the present invention is converted to the resulting catalyst by sulfiding using conventional sulfiding techniques. Sulfiding may be accomplished in situ, namely in the reactor. For example, the catalyst precursor can be brought into contact with a sulfur-containing feed in the presence of about 50 to about 1,500 V/H/V of a hydrogen-containing gas under conditions including a temperature of about 75° C. to about 450° C., a pressure (total pressure) of about 10 to about 2500 psig, and a liquid hourly space velocity of about 0.3 to about 2.0 V/H/V. After this sulfiding treatment, the sulfur-containing stream is switched over to the feedstock to be treated, and the operation is restarted under operation conditions suitable for hydrotreating of the feedstock. In addition to the above process, use may be made of a process for effecting sulfiding comprising either bringing the catalyst precursor into direct contact with hydrogen sulfide or other sulfur compounds, or by adding the sulfur compound to a suitable feedstream, such as a distillate stream, and bringing the resulting distillate into contact with the catalyst. Suitable sulfur compounds, or sulfiding agents, which may be in the sulfur containing distillate include dimethyl disulfide, butyl mercaptan, dimethyl mercaptan, carbon disulfide, and the like.

No particular limitation is imposed on the feedstream to be subjected to hydrotreatment. Preferred feedstreams include distillates and residual oils from atmospheric and vacuum distillation processes, cracked gas oil fractions, and mixtures thereof. However, particularly preferred feedstreams, are vacuum gas oil fractions, cracked gas oils, straight-run gas oils and the like, which are typically difficult to achieve desulfurization and denitrogenation at the same time. Vacuum gas oil is a distillate that is obtained by subjecting atmospheric residual oil to vacuum distillation and generally has a boiling point in a range of from about 370° C. to about 610° C. It typically contains significant levels of sulfur, nitrogen and metals. For example, a vacuum gas oil such as Arabian crude oil has a sulfur content of from about 2 to about 4 wt. % and nitrogen content of from about 0.03 to about 0.2 wt. %. In addition, it also has a Conradson carbon residue of about 1 wt. % or so. Cracked gas oil is a cracked oil, which is obtained by thermal cracking of a residual oil and generally has a boiling point of about 200° C. or higher. It is available, for example, from a coker, visbreaker or the like of a residual oil. In addition, light cycle gas oil (LCGO), heavy cycle gas oil (HCGO) and the like, which are available from catalytic cracking plants, can also be subjected to the hydrotreating process of the present invention. According to the hydrotreating process of the present invention, the above-described hydrodesulfurization and hydro-denitrogenation of vacuum gas oil can be conducted most effectively.

Hydroprocessing conditions applicable for the use of the catalysts described herein may vary widely depending on the feedstock to be treated. Thus, as the boiling point of the feed increases, the severity of the conditions will also increase. The following Table 1 serves to illustrate typical conditions for a variety of feeds.

Reaction pressures and hydrogen circulation rates below these ranges can result in higher catalyst deactivation rates resulting in less effective selective hydrotreating. Excessively high reaction pressures increase energy and equipment costs and provide diminishing marginal benefits.

Hydroprocessing using the catalyst composition of the present invention can be practiced in one or more stages or zones. In one preferred multi-stage process, a distillate boiling-range feedstock containing relatively high levels of sulfur and nitrogen is fed to a first hydrodesulfurization reaction stage to remove a substantial amount of the sulfur and nitrogen. Suitable feeds are those containing in excess of about 3,000 wppm sulfur and are typically raw virgin distillates. The product stream is passed to a separation zone wherein a vapor phase product stream and a liquid phase product stream are separated. The liquid phase product stream is then passed to a second hydrodesulfurization stage, which also contains one or more reaction zones, where it is further hydrodesulfurized in the presence of hydrogen and a second hydrodesulfurization catalyst, which may or not be the same catalyst as in the first hydrodesulfurization stage. This will typically result in a treated stream containing from about 50 to about 600 wppm sulfur. It is preferred that the product stream from the second hydrodesulfurization stage contain less than about 150 wppm sulfur, more preferably less than about 100 wppm sulfur, and most preferably less than about 50 wppm sulfur. This twice hydrodesulfurized stream can be passed to a third reaction stage and reacted in the presence of hydrogen and a catalyst capable of further reducing the sulfur level and hydrogenating aromatics. The sulfur level of the final product stream will be less than about 10 wppm, preferably less than about 5 wppm, and more preferably less than about 1 wppm sulfur. It is within the scope of this invention that at least a portion of the vapor product stream from either or both reaction stages can be recycled to the first reaction stage.

The hydrotreating catalyst of the present invention can be used in any one of fixed-bed, fluidized-bed and moving-bed reaction systems. Adoption of a fixed bed is, however, preferred from the apparatus or operation standpoint. Further, it is also possible to achieve high desulfurization and denitrogenation levels by conducting hydrotreatment in plural, that is, two or more reactors connected together.

The following examples will serve to illustrate, but not limit, this invention.

Either silica spheres or alumina extrudates were used as the catalyst support.

The silica spheres were nominally 1.2 to 1.6 mm in diameter and used as received. They had BET surface area of 237 m²/g with a pore volume of 1.10 cc/g and an average pore

TABLE 1

| FEED | TYPICAL BOILING RANGE ° C. | TEMP ° C. | PRESS, BARS | SPACE VELOCITY V/V/HR | H₂ GAS RATE SCF/B |
|---|---|---|---|---|---|
| Naphtha | 25-210 | 100-370 | 10-60 | 0.5-10 | 100-2,000 |
| Diesel | 170-350 | 200-400 | 15-110 | 0.5-4 | 500-6,000 |
| Heavy Gas Oil | 325-475 | 260-430 | 15-170 | 0.3-2 | 1000-6,000 |
| Lube Oil | 290-550 | 200-450 | 6-210 | 0.2-5 | 100-10,000 |
| Residuum | 10-50% > 575 | 340-450 | 65-1100 | 0.1-1 | 2,000-10,000 | diameter (from BJH nitrogen desorption isotherms) of 140 Å. The alumina extrudates were approximately 1.3 mm in diameter with a BET surface area of 230 m$^2$/g, with a pore volume of 0.60 cc/g, and an average pore diameter of 100 Å.

EXAMPLES

Example 1

Preparation of Support Composed of 15 wt. % Y$_2$O$_3$/Silica 60 grams of the silica spheres described above were selected. A solution containing 35.92 grams of yttrium nitrate hexahydrate was dissolved in an aqueous solution of 72 cc total volume. The solution was impregnated onto the silica spheres by incipient wetness. The solid was dried at 100° C. overnight and then calcined at 450° C. for four hours to produce the 15 wt. % Y$_2$O$_3$/SiO$_2$ sample.

Example 2

Preparation of Support Composed of 5 wt. % Y$_2$O$_3$/Alumina 20 grams of the alumina extrudates described above were selected. A solution containing 3.56 grams of yttrium nitrate hexahydrate was dissolved in an aqueous solution of 14 cc total volume. The solution was impregnated onto the alumina extrudates by incipient wetness. The solid was dried at 100° C. overnight and then calcined at 450° C. for four hours to produce the 5% wt. % Y$_2$O$_3$/Al$_2$O$_3$ sample.

Example 3

Preparation of 6 wt. % CoO, 24 wt. % MoO$_3$/SiO$_2$ Hydrotreating Catalysts (Calcined at 400+° C. to Remove All Organic Components)

A. 23.3 grams of cobalt nitrate hexahydrate (0.080 moles Co) and 29.43 grams of ammonium heptamolybdate tetrahydrate (0.167 moles Mo) together with 73.6 grams of triethanolamine (TEA) (0.49 moles) were dissolved in water heated to 55° C. to 60° C. to give a total solution volume of 75 cc [TEA/(Co+Mo) mole ratio about 2/1] with a pH around 8.9. This solution was impregnated by incipient wetness onto 70 grams of the neat silica spheres described above. The sample was dried at 100° C. overnight and heated at 0.5° C. per minute to 400° C. and held there for four hours.

B. 23.3 grams of cobalt nitrate hexahydrate (0.080 moles Co) and 29.43 grams of ammonium heptamolybdate tetrahydrate (0.167 moles Mo) together with 107.13 grams arginine (ARG) (0.62 moles) and 15 cc of concentrated NH$_4$OH were dissolved in water heated to 50° C. to give a total volume of 150 cc [arginine(Co+Mo) mole ratio about 2.5/1]. The solution pH measured 9.3. This solution was impregnated by incipient wetness onto 70 grams of the neat silica spheres described above in two steps with a 120° C. drying in between. In the first step, 80 cc of impregnating solution was used and in the second step the remaining 70 cc of impregnating solution was used. The sample was dried at 100° C. overnight and heated at 0.5° C. per minute to 400° C. and held there for four hours.

C. 4.66 grams of cobalt nitrate hexahydrate (0.016 moles Co) and 5.88 grams of ammonium heptamolybdate tetrahydrate (0.033 moles Mo) together with 8.59 grams arginine (0.05 moles) and 2.5 cc of concentrated NH$_4$OH were dissolved in water heated to 55° C. to give a total volume of 25 cc [arginine/(Co+Mo) mole ratio about 1/1]. The solution pH measured 8.9. This solution was impregnated by two incipient incipient wetness impregnations onto 14 grams of the neat silica spheres described above. The sample was dried at 100° C. overnight and heated at 0.5° C. per minute to 450° C. and held there for four hours.

D. 5.82 grams of cobalt nitrate hexahydrate (0.02 moles Co) and 7.36 grams of ammonium heptamolybdate tetrahydrate (0.042 moles Mo) were dissolved in water heated to 55° C. to give a total volume of 20 cc. The pH measured 3.8. This solution was impregnated by incipient wetness (single impregnation) onto 17.5 grams of the neat silica spheres described above. The sample was dried at 100° C. overnight and heated at 0.5° C. per minute to 400° C. and held there for four hours.

Example 4

Measurement of Oxygen Chemisorption

Measurements were conducted in an Altamira AMI-100 catalyst characterization device. This is a volumetric device that allows treatment of material using an array of gases. A thermal conductivity cell (TCD) is used for detection of active probe in the effluent stream from the sample cell. The oxygen technique involves an in-situ calcination at low temperature followed by activation of the metals using gas-phase sulfiding with 10% H$_2$S/H$_2$ gas. After the metals were sulfided, they were "titrated" by exposure to sequential, fixed-volume pulses of 10% O$_2$/helium until oxidation is complete and O$_2$ breakthrough is achieved.

The following procedure was used to evaluate the samples. About 200-250 mgs of as received sample was accurately weighed into the 0.25-inch U-shaped quartz sample cell. The sample cell was loaded into the instrument so that it was evaluated in an "upflow" mode. The sample was first calcined in-situ, with 100% helium at 25 cc/min, with a 20° C./min ramp to 200° C., held for 30 min at 200° C., cooled to 150° C., held at that temperature for 5 minutes, and then the gas is then switched to 10% H$_2$S/H$_2$ with a flow rate of 40 cc/min. The temperature was then ramped at 10° C./min to 204° C. and held at 204° C. for 60 minutes. The temperature is then increased at 10° C./min to 345° C. in flowing H$_2$S/H$_2$, and then held for 60 minutes at 345° C. The sample was then cooled to 100° C. under flowing H$_2$S/H$_2$ at 10° C./min, held at 100° C. for 5 minutes, at which time the gas was switched to 100% helium flowing at 25 cc/min. The sample was cooled to ambient at 5° C./min in flowing helium, and held at ambient temperature for an additional 15 minutes. A 100% helium stream at 25 cc/min was then flowed over the catalyst, and a pulse of 10% O$_2$/helium is introduced into the carrier stream. The gas stream was analyzed for 2 minutes with 1.5 minutes between injections (total of 3.5 minutes per injection cycle). A total of 75 pulses of O$_2$/helium are injected. From the measurement of O$_2$ breakthrough, the O$_2$ uptake in micrograms of O/gm sample was calculated. The mole ratio of O to Co was then calculated and presented at the Co dispersion in %. This number is believed to relate to the dispersion (lateral dimension) of the crystallites. For higher dispersion values, the crystallites are smaller. Smaller crystallites to a first approximation should give a higher number of active sites.

Example 5

Measurement of Stack Height by Transmission Electron Microscopy (TEM)

1-2 grams of each of the catalysts from the above examples were placed in a quartz boat that was, in turn, inserted into a horizontal quartz tube and placed into a Lindberg furnace.

While still at room temperature, a flow of 200 cc/min 10% $H_2S/H_2$ was admitted for 15 minutes, then the temperature was raised to 400° C. in 45 minutes with the 10% $H_2S/H_2$ flowing at 200 cc/min. This flow was continued for 2 hours at 400° C. The heat was then turned off and the resulting catalyst was cooled in flowing $H_2S/H_2$ to room temperature and held at room temperature for about 30 minutes under the same flow. Then 300 cc/min of nitrogen was admitted for 30 minutes. After that, a 1% oxygen in helium passivation gas was admitted at room temperature and flowed at 50 cc/min overnight. The sample was then removed from the furnace. X-ray diffraction spectra were recorded on samples of these sulfided and passivated materials. In addition, samples of the sulfided precursors were crushed into pieces (less than 100 mm thick), dusted onto holey-carbon coated TEM grids, and examined in a bright field TEM imaging mode of a Phillips CM200F instrument. 250-350 different crystals of the sulfided precursor were examined and the stack heights counted and a histogram obtained.

Example 6

Characterization of the Co—Mo/$SiO_2$ Catalysts of Example 3

Both the O chemisorption and TEM histograms of the samples of Example 3 were measured as described in Examples 4 and 5 and the results are summarized in Table 2 below. The table shows the characterization of catalysts of Example 3: Co—Mo on silica impregnated either with or without amino acid or amino alcohol added to aqueous impregnation solution; and for those samples containing organic, they were calcined to remove any organic component.

TABLE 2

Characterizations of Catalysts of Example 3

| Example | Wt. % CoO | Wt. % $MoO_3$ | Co Dispersion, O/Co × 100 | Stack Height |
|---|---|---|---|---|
| 3A | 6 | 24 | 8.3 | 3.37 |
| 3B | 6 | 24 | 7.0 | 3.34 |
| 3C | 6 | 24 | 6.4 | 3.53 |
| 3D | 6 | 24 | 4.6 | 3.75 |

The data in Table 2 above shows that for all these catalysts with either TEA or arginine added to the impregnating solution in different quantities and then calcined to remove the organic or for the aqueous non-organic impregnation the dispersions are below 10% and the stack heights are greater than 3. It also appears that the dispersion number, which is believed to measure the lateral dimension of the crystallites, correlates with the stack height of the sulfide sheets, which indicates that as the crystallites get taller (i.e., the stack height increases), the dispersion decreases (i.e., the crystallites get fatter).

Example 7

Preparation of 6 wt. % CoO, 24 wt. % $MoO_3$/$Y_2O_3$—$SiO_2$ Hydrotreating Catalysts (Calcined at 400+° C. to Remove All Organic Components.)
A. 5.82 grams of cobalt nitrate hexahydrate (0.02 moles Co) and 7.36 grams of ammonium heptamolybdate tetrahydrate (0.042 moles Mo) together with 10.7 grams arginine (0.062 moles) (arg/(Co+Mo) mole ratio of 1:1) and 3 cc of concentrated $NH_4OH$ were dissolved in water maintained at 60° C. to give a total volume of 23 cc. This solution was impregnated by incipient wetness onto 17.5 grams (one impregnation) of the 15% $Y_2O_3$/silica support described in Example 1 hereof. The sample was dried at 100° C. overnight and heated at 0.5° C. per minute to 400° C. and held there for four hours.

B. 4.66 grams of cobalt nitrate hexahydrate (0.016 moles Co) and 5.88 grams of ammonium heptamolybdate tetrahydrate (0.033 moles Mo) together with 21.4 grams arginine (0.125 moles) and 3 cc of concentrated $NH_4OH$ were dissolved in water maintained at 60° C. to give a total volume of 30 cc [arginine/(Co+Mo) mole ratio about 2.5/1]. The solution pH measured 9.2. This solution was impregnated by incipient wetness in two steps (16 cc and 14 cc) onto 14 grams of the 15% $Y_2O_3$/Silica support described in Example 1 hereof. After the first impregnation, the sample was dried at 100° C. overnight, and then impregnated with the second solution and again dried overnight at 100° C. The sample was then heated at 0.5° C. per minute to 400° C. and held there for four hours.

Example 8

Characterization of the Co—Mo/$Y_2O_3$—$SiO_2$ Catalysts of Example 7

Both the O chemisorption and TEM histograms of the samples of Example 7 were measured as described in Examples 4 and 5 and the results are summarized in Table 3 below. Co—Mo on yttria-containing silica impregnated with amino acid added to aqueous impregnation solution and calcined to remove any organic component.

TABLE 3

Characterizations of Catalysts of Example 7

| Example | Wt. % CoO | Wt. % $MoO_3$ | Co Dispersion, O/Co × 100 | Stack Height |
|---|---|---|---|---|
| 7A | 6 | 24 | 13.9 | 2.91 |
| 7B | 6 | 24 | 25.4 | 1.85 |

The data in Tables 2 and 3 above clearly show a substantially major increase in dispersion when yttria-modified silica is used instead of neat silica.

Example 9

Preparation of 6 wt. % CoO, 24 wt. % $MoO_3$/$Al_2O_3$ (No Ytria Modification) Hydrotreating Catalysts (Calcined at 400+° C. to Remove All Organic Components.)
A. 5.82 grams of cobalt nitrate hexahydrate (0.02 moles Co) and 7.36 grams of ammonium heptamolybdate tetrahydrate (0.042 moles Mo) together with 10.7 grams arginine [0.062 moles) (arg/Co+Mo) mole ratio 1:1] and 2.5 cc of concentrated $NH_4OH$ were dissolved in water to give a total volume of 23 cc. The pH measured 8.9. This solution was impregnated by incipient wetness onto 17.5 grams of the alumina extrudates as described above. Because of the low pore volume of the alumina, it was necessary to do two incipient wetness impregnations with an intermittent drying at 100° C. overnight. The two solution volumes used were 13 cc for the first impregnation and the remaining 10 cc for the second impregnation. Finally, the sample was dried at 100° C. overnight and heated at 0.5° C. per minute to 450° C. and held there for four hours.

B. In the first step of preparing a 6 wt. % CoO-24 wt. % MoO₃ on Al₂O₃ catalyst, a sample of nominal composition 7.9 wt. % CoO on alumina was prepared as follows. 16 cc of an aqueous solution (pH around 9.2) containing 7.67 grams of cobalt nitrate hexahydrate and 13.7 grams of arginine (Aldrich) (arg/Co mole ratio 3:1) initially heated to 60° C. to facilitate dissolution was added by incipient wetness impregnation to 23 grams of alumina. The sample was dried at 100° C. for four hours. Then it is calcined by heating at 0.5° C. per minute to 275° C. and held there for four hours to partially decompose the Co arginine complex. 3.88 grams of this sample was taken and impregnated by incipient wetness with an aqueous solution of 2 cc containing 1.47 grams of ammonium heptamolybdate and 1.45 grams of arginine (mole ratio arg/Mo 1:1). The sample was dried overnight at 100° C. and heated at 0.5° C. per minute to 425° C. to completely decompose the Co/arginine complex and held there for four hours.

Example 10

Characterization of the Co—Mo/Al₂O₃ Catalysts of Example 9

Both the O chemisorption and TEM histograms of the samples of Example 9 were measured as described in Examples 4 and 5 above and the results are summarized in Table 4 below. Co—Mo on alumina impregnated with amino acid added to aqueous impregnation solution and calcined to remove any organic component.

TABLE 4

Characterizations of Catalysts of Example 9

| Example | Wt. % CoO | Wt. % MoO₃ | Organic:Metal Mole Ratio | Sequence | Co Dispersion, O/Co × 100 | Stack Height |
|---|---|---|---|---|---|---|
| 9A | 6 | 24 | 1:1 | Co-impregnation | 23.9 | |
| 9B | 6 | 24 | 3:1; then 1:1 | Sequence | 27.4 | 2.17 |

Example 11

Preparation of 6 wt. % CoO, 24 wt. % MoO₃/Y₂O₃—Al₂O₃ Hydrotreating Catalysts (Calcined at 375-425+° C. to Remove All Organic Components.)

This sample was prepared in an analogous way to that described in Example 9B above except that it was prepared on the same alumina, which had first been impregnated with dispersed yttrium oxide. In the first step of preparing a 6 wt. % CoO-24 wt. % MoO₃ on Al₂O₃ catalyst, a sample of nominal composition of 7.9 wt. % CoO on yttria treated alumina is prepared as follows. 25 cc of an aqueous solution initially heated to 60° C. to facilitate dissolution and containing 10.2 grams of cobalt nitrate hexahydrate and 15.242 grams of arginine (Aldrich) (arg/Co mole ratio 2.5:1) and at a pH of 8.9 was added by incipient wetness impregnation to 30.7 grams of yttria-alumina support described in Example 2 above. The sample is dried at 100° C. for four hours. Then it is calcined by heating at 0.5° C. per minute to 275° C. and held there for four hours to partially decompose the Co arginine complex. 25.3 grams of this sample was taken and impregnated by a single incipient wetness impregnation with an aqueous solution of 16 cc containing 9.81 grams of ammonium heptamolybdate and 9.6 grams of arginine (mole ratio arg/Mo 1:1). Portions of this sample was dried overnight at 100° C. and heated at 0.5° C. per minute to 425° C. and held at these temperatures for four hours. The sample had the same thermal treatment as in Example 9B above, except that it was made on a yttrium oxide coated alumina rather than the neat alumina.

Example 12

Characterization of the Co—Mo/Al₂O₃ Catalyst of Example 11

Both the O Chemisorption and TEM histograms of the catalyst sample of Example 11 was measured as described in Examples 4 and 5 above and the results are summarized in Table 5 below. Co—Mo on yttria-coated alumina impregnated with amino acid added to aqueous impregnation solution and calcined to remove any organic component.

TABLE 5

Characterizations of Catalysts of Example 11

| Example | Wt. % CoO | Wt. % MoO₃ | Organic:Metal Mole Ratio | Co Dispersion, O/Co × 100 | Stack Height |
|---|---|---|---|---|---|
| 11 | 6 | 24 | 2.5:1; then 1:1 | 35.1 | 1.74 |

The data in Table 5 above compared to that in Table 4 hereof shows that the surface treatment with Y₂O₃ improves the dispersion and decreases the stack height of the catalysts for both the alumina as well as for silica supported catalysts.

Consequently, the above data clearly shows that by increasing the isoelectric point by using a metal oxide surface coating of a metal oxide that disperses well, that does not itself sulfide and which has a high isoelectric point (i.e., a low charge to radius ratio), that one can, by using the amino acid or amino alcohol impregnates, create a higher dispersed sulfide, even if the organic is calcined before the sulfidation. Yttrium oxide and the closely related rare earth oxides are ideal candidates for combination with the amino acid and amino alcohol impregnates for improving dispersion.

Example 13

The catalysts of Examples 9B and 11 above were compared in a pilot plant hydroprocessing run. A straight run gas oil feed containing about 1.6% sulfur and 90 wppm Nitrogen was run at a temperature of 337° F., 175 psig, LHSV=0.77, 1400 scf/B H₂. Catalysts were presulfided prior to the run. Data was collected over a two-week period to insure lineout of results. Rate constants for HDS (hydrodesulfurization) were calculated based on 1.5 order kinetics. The results are shown in Table 6 below.

TABLE 6

Comparison of Catalyts of Examples 9B and 11

| Example | HDS Rate Constant |
|---------|-------------------|
| 9B      | 1.04              |
| 11      | 1.20              |

What is claimed is:

1. A method for preparing a catalyst composition, which method comprises:
   (a) impregnating an inorganic catalyst support with an effective amount of a salt of a metal selected from the rare earth metals and yttrium;
   (b) drying said impregnated catalyst support to remove substantially all water;
   (c) calcining said dried impregnated catalyst support to produce a modified catalyst support;
   (d) impregnating said modified catalyst support with an aqueous solution having a pH of greater than 3.8 containing
      (i) a salt of a Group VIII metal selected from Co and Ni,
      (ii) a salt of a Group VI metal selected from Mo and W, and
      (iii) an effective amount of an organic agent selected from amino alcohols and amino acids;
   (e) drying said impregnated modified catalyst support to remove substantially all water, thereby resulting in a metal-organic on catalyst support precursor;
   (f) calcining said dried modified catalyst precursor at calcination temperatures and in an oxygen-containing atmosphere wherein at least a portion of the organic portion of the catalyst precursor is oxidized;
   (g) sulfiding said partially oxidized catalyst precursor at sulfiding conditions in the presence of a sulfiding agent, thereby resulting in a sulfided catalyst composition.

2. The method of claim 1 wherein substantially all of the organic portion of the catalyst precursor of step (f) is oxidized.

3. The method of claim 1 wherein the metal is yttrium.

4. The method of claim 1 wherein the Group VIII metal is Co.

5. The method of claim 4 wherein the Group VI metal is Mo.

6. The method of claim 1 wherein the organic agent is an amino alcohol.

7. The method of claim 6 wherein the amino alcohol is selected from the mon-, di-, and tri-, substituted aliphatic hydroxyalkylamines.

8. The method of claim 6 wherein the amino alcohol is selected from the group consisting of methanolamine, diniethanalamine, trimethanolamine, ethanolamine, di-ethanolamine, triethanolamine, butanolamine, dibutanolamine, tributanolamine, propanolamine, dipropanaolamine, tripropanolamine, N,N,-dialkyl-ethanolamines, N-alkyl-diethanolamines, N-alkyl-ethanolamines, N,N,-dialkyl-propanolamines, N-alkyl-dipropanolamines, N-alkyl-propanolamines, N,N,-dialkyl-propanolamines, N-alkyl-dipropanolamines, N-alkyl-propanolamines, N,N,-dialkyl-propanolamines, N-alkyl-dipropanolamines, N-alkyl-propanolamines, N,N,-dialkyl-butonolamines, N-alkcyl-dibutanolamines, N-alkyl-butanolamines, N,N,-dialkyl-butanolamines, N-alkyl-dibutanolamines, N-alkyl-butanolamines, N,N,-dialkyl-hexanolamines, N-alkyl-dibexanolamines, N-alkyl-hexanolamines, N,N,-dialkyl-hexanolamines, N-alkyl-dihexanolamines, N-alkyl-hexanolamines, N,N,-dialkyl-heptanolamines, N-alkyl-diheptanolamines, N-alkyl-heptanolamines, N,N,-dialkyl-heptanolamines, N-alkyl-diheptanolamines, N-alkyl-heptanolamines.

9. The method of claim 8 wherein the amino alcohol is triethanolamine.

10. The method of claim 8 wherein the N-alkyl group is a hydrocarbon or substituted hydrocarbon group containing from 1 to 50 carbon atoms.

11. The method of claim 10 wherein the hydrocarbon group is selected from the group consisting or methyl, ethyl, n-propyl, isopropyl, n-butyl, isobutyl, n-pentyl, isopentyl, n-hexyl, and isohexyl.

12. The method of claim 1 wherein the organic agent is an amino acid.

13. The method of claim 12 wherein the amino acid is selected from the group consisting of alanine, arginine, asparagines, aspartic acid, cysteine, cystine, 3,5-dibromotyrosine, 3,5, diiodotyrosine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine and valine.

14. The method or claim 13 wherein the amino acid is arginine.

15. The method of claim 1 wherein the sulfiding agent is a mixture of $H_2S$ and $H_2$ and the sulfiding temperatures range from about 360° C. to about 400° C.

16. The method of claim 1 wherein said inorganic support is selected from the group consisting of silica, alumina, silica-alumina, titania, and zirconia.

17. The method of claim 16 wherein said inorganic support is selected from silica and alumina.

18. A method for preparing a catalyst composition, which method comprises:
   (a) impregnating an inorganic catalyst support with an effective amount of a salt of a metal selected from the rare earth metals and yttrium;
   (b) drying said impregnated catalyst support to remove substantially all water;
   (c) calcining said dried impregnated catalyst support to produce a modified catalyst support;
   (d) impregnating the modified catalyst support with an aqueous solution containing:
      (i) a first metal selected from the Group VIII metal selected from Co and Ni and a Group VI metal selected from Mo and W, and
      (ii) an effective amount of an organic agent selected from amino alcohols and amino acids, wherein the choice of said first metal from Group VIII and Group VI leaves the remaining choice as a second metal;
   (e) calcining said dried impregnated catalyst support to produce a modified catalyst support;
   (f) drying said impregnated rare earth modified catalyst support to remove substantially all water, thereby resulting in a substantially dried catalyst precursor comprised of a first metal-organic component on support;
   (g) impregnating said partially oxidized catalyst precursor with an aqueous solution having a pH of greater than 3.8 comprised of a salt of said second metal and an effective amount of an organic agent selected from the group consisting of amino alcohols and amino acids;
   (h) drying said impregnated catalyst precursor of step (g) to remove substantially all water, thereby leaving a partially oxidized catalyst precursor further containing a second metal-organic component;
   (i) calcining said dried catalyst precursor at calcination temperatures in the presence of an oxygen-containing atmosphere wherein at least a portion of the organic portion of the catalyst precursor is oxidized;

(j) sulfiding said final partially oxidized catalyst precursor composition at effective sulfidation conditions in the presence of a sulfiding agent to produce a sulfided catalyst composition.

19. The method of claim 18 wherein substantially all of the organic portion of the catalyst precursor is oxidized in step (i).

20. The method of claim 18 wherein said rare earth metal is yttrium.

21. The method of claim 18 wherein the Group VIII metal is Co.

22. The method of claim 18 wherein the Group VI metal is Mo.

23. The method of claim 18 wherein the organic agent is an amino alcohol.

24. The method of claim 23 wherein the amino alcohol is selected from the group consisting of methanolamine, dimethanolamine, trimethanolamine, ethanolamine, diethanolamine, triethanolamine, butanolamine, dibutanolamine, tri-butanolamine, propanolamine, dipropanaolamine, tripropanolamine, N,N,-dialkyl-ethanolamines, N-alkyl-diethanolamines, N-alkyl-ethanolamines, N,N,-dialkyl-propanolamines, N-alkyl-dipropanolamines, N-alkyl-propanolamines, N,N,-dialkyl-propanolamines, N-alkyl-dipropanolamines, N-alkyl-propanolamines, N,N,-dialkyl-propanolamines, N-alkyl-dipropanolamines, N-alkyl-propanolamines, N,N,-dialkyl-butonolamines, N-alkyl-dibutanolamines, N-alkyl-butanolamines, N,N,-dialkyl-butanolamines, N-alkyl-dibutanolamines, N-alkyl-butanolamines, N,N,-dialkyl-hexanolamines, N-alkyl-dihexanolamines, N-alkyl-hexanolamines, N,N,-dialkyl-hexanolamines, N-alkyl-dihexanolamines, N-alkyl-hexanolamines, N,N,-dialkyl-heptanolamines, N-alkyl-diheptanolamines, N-alkyl-heptanolamines, N,N,-dialkyl-heptanolamines, N-alkyl-diheptanolamines, N-alkyl-heptanolamines.

25. The method of claim 24 wherein the amino alcohol is triethanolamine.

26. The method of claim 24 wherein the N-alkyl group is a hydrocarbon or substituted hydrocarbon group containing from 1 to 50 carbon atoms.

27. The method of claim 26 wherein the hydrocarbon group is selected from the group consisting of methyl, ethyl, n-propyl, isopropyl, n-butyl, isobutyl, n-pentyl, isopentyl, n-hexyl, and isohexyl.

28. The method of claim 18 wherein the organic agent is an amino acid.

29. The method of claim 28 wherein the amino acid is selected from the group consisting of alanine, arginine, asparagines, aspartic acid, cysteine, cystine, 3,5-dibromotyrosine, 3,5, diiodotyrosine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine and valine.

30. The method of claim 29 wherein the amino acid is arginine.

31. The method of claim 18 wherein the sulfiding agent is a mixture of $H_2S$ and $H_2$ and the sulfiding temperatures range from about 360° C. to about 400° C.

32. The method of claim 18 wherein said inorganic support is selected from the group consisting of silica, alumina, silica-alumina, titania, and zirconia.

33. The method of claim 32 wherein said inorganic support is selected from silica and alumina.

* * * * *